United States Patent [19]
Mariani et al.

[11] Patent Number: 6,107,400
[45] Date of Patent: *Aug. 22, 2000

[54] PROCESS FOR TRANSFORMING A STARTING MATERIAL CONTAINING AT LEAST TWO DIFFERENT THERMOPLASTIC MATERIALS INTO A HOMOGENEOUS THERMOPLASTIC MATERIAL

[75] Inventors: Cinzia Licia Mariani; Giordano Mariani, both of Milan, Italy

[73] Assignee: BAMI Intelligence, S.A., Panama

[*] Notice: This patent is subject to a terminal disclaimer.

[21] Appl. No.: 09/149,669

[22] Filed: Sep. 9, 1998

Related U.S. Application Data

[63] Continuation of application No. 08/897,370, Jul. 21, 1997, Pat. No. 5,891,955, which is a continuation of application No. 08/736,027, Oct. 23, 1996, abandoned, which is a continuation of application No. 08/546,620, Oct. 23, 1995, abandoned, which is a continuation of application No. 08/296,864, Aug. 26, 1994, abandoned, which is a continuation of application No. 07/955,710, Dec. 15, 1992, abandoned.

[30] Foreign Application Priority Data

Apr. 16, 1991 [IT] Italy ............................... TO91A0288
Apr. 8, 1992 [WO] WIPO ..................... PCT/CH92/00064

[51] Int. Cl.⁷ ........................................ C08J 11/04
[52] U.S. Cl. ............................ 525/51; 264/40.1; 264/68; 264/911
[58] Field of Search .............................. 264/68, 40.1, 122, 264/911; 525/51

[56] References Cited

U.S. PATENT DOCUMENTS 3,406,426 10/1968 Pobst, Jr. et al. .
3,522,934 8/1970 Walter .
3,852,046 12/1974 Brown .

(List continued on next page.)

FOREIGN PATENT DOCUMENTS 1 163 074   3/1984   Canada .
0 045 734   2/1982   European Pat. Off. .
0 140 846 A2   5/1985   European Pat. Off. .
0 140 846 A3   5/1985   European Pat. Off. .

(List continued on next page.)

OTHER PUBLICATIONS

International Search Report of PCT/CH92/00064, plus Annex (Dec. 1992).
*Mixed Plastics Recycling,* B. Dubrulle d'Orchel, 4602 PE Plast Europe (1993) Jun., No. 2, Munich, DE.
*Kunststoffe in Verpackungsabfällen identifizieren,* 2376 Kunststoffe, 83(1992) Apr., No. 4, Munchen, DE.
*Bekanntes Verfahren mit neuen Perspektiven,* 35(1984) Jun., No. 6, Speyer, W. Germany.
*Recyclag Des Plastiques,* 986 Caoutchoucs & Plastiques, 69 (1992) Sep., No. 716, Paris, FR.
*A Demanding Second Use for Recycled Plastic,* 4602 PE Plast Europe (1992) May, No. 2, Munich, DE.
*Werkstoffliches Recycling von Altkunststoffen–Technologie und Anwendungen, Teil,* 4020 Plastverarbeiter 45(1994) May, No. 5, Heidelberg, DE.
*Rationalisierungs–effekte bei der Kunststoffverarbeitung,* 729 Kunststoffberater 38 (1993) Nov., No. 11, Isernhagen, DE.

*Primary Examiner*—Allan R. Kuhns
*Attorney, Agent, or Firm*—Schnader Harrison Segal & Lewis

[57] ABSTRACT

At least two thermoplastic polymers in a divided state are stirred to produce a homogeneous thermoplastic material. The polymers are inserted into the enclosure and stirred by the blades of the rotor, whereafter the resulting homogeneous material is discharged through the outlet. A sharp increase in the power consumption of the engine indicates that the material has become homogeneous.

13 Claims, 4 Drawing Sheets

U.S. PATENT DOCUMENTS

| | | |
|---|---|---|
| 4,067,826 | 1/1978 | Emery . |
| 4,123,226 | 10/1978 | Vanderveen . |
| 4,136,975 | 1/1979 | Forseth . |
| 4,139,309 | 2/1979 | Billingsley . |
| 4,142,804 | 3/1979 | Crocker . |
| 4,143,001 | 3/1979 | Raab et al. . |
| 4,189,291 | 2/1980 | Longhi . |
| 4,225,640 | 9/1980 | Erb . |
| 4,250,222 | 2/1981 | Mavel et al. . |
| 4,254,068 | 3/1981 | Otsuka . |
| 4,323,531 | 4/1982 | Bradley et al. . |
| 4,325,515 | 4/1982 | Herfeld . |
| 4,421,412 | 12/1983 | Hold et al. ................................. 366/76 |
| 4,460,277 | 7/1984 | Schulz et al. . |
| 4,818,113 | 4/1989 | Patel . |
| 4,826,324 | 5/1989 | Kunz et al. . |
| 5,073,416 | 12/1991 | Avakian et al. . |
| 5,094,604 | 3/1992 | Chavez et al. . |
| 5,102,326 | 4/1992 | Bacher et al. . |
| 5,177,146 | 1/1993 | Scobbo, Jr. et al. . |
| 5,891,955 | 4/1999 | Mariani et al. ............................. 525/51 |

FOREIGN PATENT DOCUMENTS

| | | |
|---|---|---|
| 0 232 927 A2 | 8/1987 | European Pat. Off. . |
| 0 244 121 A1 | 11/1987 | European Pat. Off. . |
| 0 140 846 B1 | 11/1988 | European Pat. Off. . |
| 0 549 497 A1 | 6/1993 | European Pat. Off. . |
| WO 93/15819 | 8/1993 | European Pat. Off. . |
| 1157336 | 7/1956 | France . |
| 1263631 | 6/1961 | France . |
| 2 316 064 | 7/1975 | France . |
| 55-109-622 | 8/1980 | Japan . |
| 1 227 44 | 1/1960 | New Zealand . |
| 58699 | 11/1970 | Poland . |
| 500 755 | 8/1994 | Sweden . |
| 1087-344 | 4/1984 | U.S.S.R. . |
| 954366 | 7/1960 | United Kingdom . |

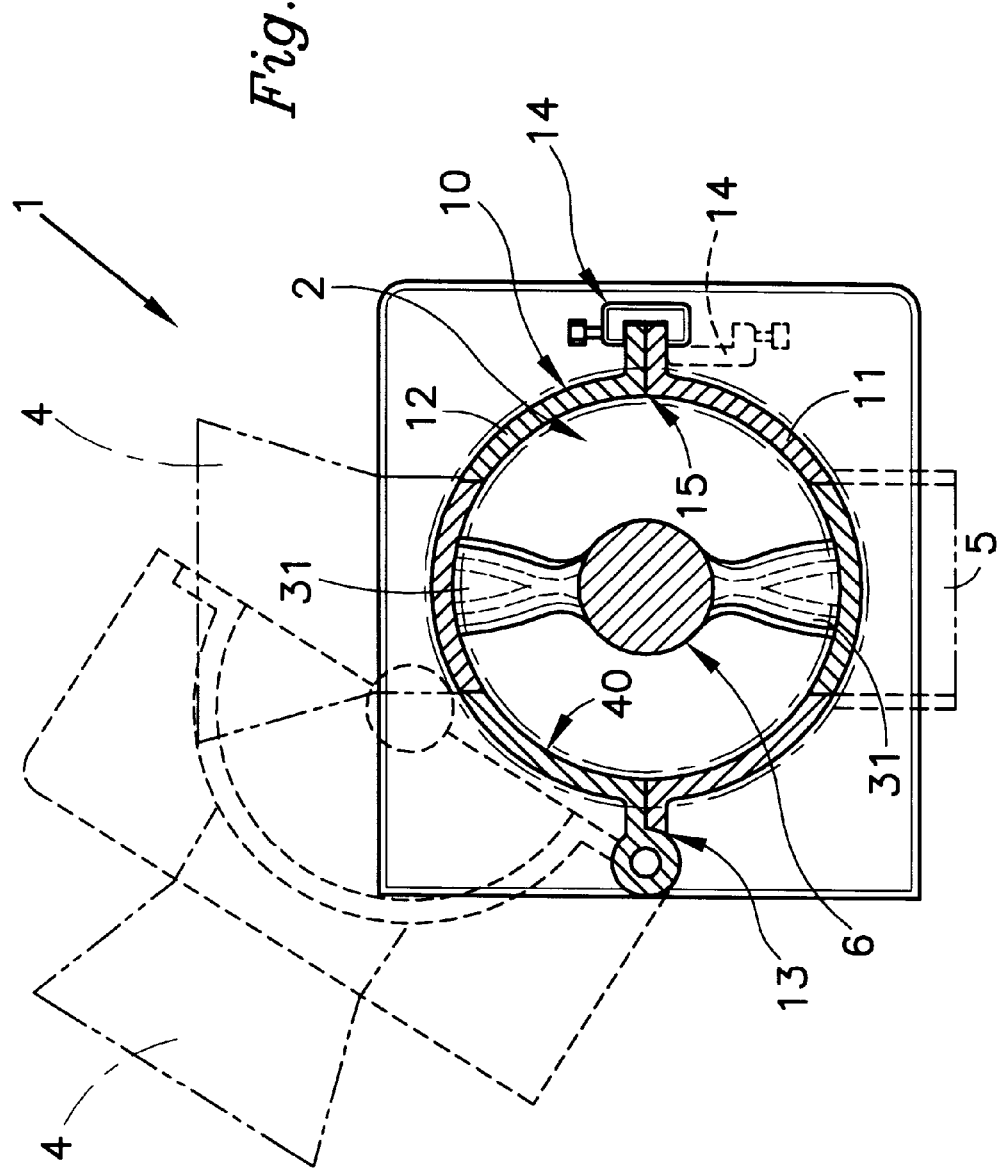

PROCESS FOR TRANSFORMING A STARTING MATERIAL CONTAINING AT LEAST TWO DIFFERENT THERMOPLASTIC MATERIALS INTO A HOMOGENEOUS THERMOPLASTIC MATERIAL

This application is a continuation of prior application Ser. No. 08/897,370, filed on Jul. 21, 1997, now U.S. Pat. No. 5,891,955, which is a continuation of application Ser. No. 08/736,027, filed Oct. 23, 1996, now abandoned, which is a continuation of application Ser. No. 08/546,620, filed Oct. 23, 1995, now abandoned, which is a continuation of application Ser. No. 08/296,864, filed Aug. 26, 1994, now abandoned, which is a continuation of application Ser. No. 07/955,710, filed Dec. 15, 1992, now abandoned.

One aspect of the present invention is a process of treatment of plastic materials enabling the transformation of a starting raw material containing at least two different thermoplastic polymers or copolymers into an homogeneous thermoplastic material. Another aspect of the invention is a device for carrying out this process and applications of this process.

The aim of the invention is in particular to enable the obtention of a new thermoplastic material, capable of being used in the same manner and in the same fields of industrial application as the known thermoplastic materials, from at least two thermoplastic materials of different chemical nature.

The invention more particularly aims to enable the recycling of thermoplastic polymers or copolymers, without prior separation of such polymers or copolymers according to their chemical nature.

As it is known, it is desirable to re-use waste plastic materials, such as those arising from the disposal of packaging articles or material mixed with food residues in domestic refuse, in order to avoid, or at least to reduce the accumulation of this waste in nature, and also to slow down the depletion of sources of non-renewable raw materials, in particular, the crude oil that goes into the manufacture of plastic materials.

According to present day techniques, recycling thermoplastic polymers necessitates the separate recovery and re-use of plastic materials of differing chemical nature, because generally they are non miscible with one another and when one tries to re-use mixtures of solid particles of different thermoplastic polymers while using the same machines and the same operation conditions as those employed in the case of a single thermoplastic polymer, articles are obtained which are made of heterogeneous material, of which the mechanical, physical and chemical characteristics, such as the elasticity modulus, the values of tensile strength, flexural strength, compressive strength, resistance to the chemical attack by various liquid or gaseous substances, etc., are not well determined.

In practice, the need for recovering and re-using separately the different thermoplastic polymers places a limitation of an economic order which reduces considerably the possibilities of recycling waste plastic materials, in particular, those which are contained in domestic refuse.

The object of the invention is to provide a solution to the problem of recycling waste thermoplastic polymers, while allowing the obtention of a homogeneous thermoplastic material which can be used with the same techniques as those employed in the case of the original thermoplastic polymers, and eliminating the need to separate or sort out these wastes beforehand according to the chemical nature of the polymers which make them up.

To this end, the process according to the invention is characterized in that at least two different thermoplastic polymers or copolymers, in a divided state, are subjected to a treatment of agitation and stirring in such a way that a product, which essentially consists of a homogeneous thermoplastic material, is obtained.

Said treatment is advantageously carried out in a closed chamber provided with mechanical agitator means. Said mechanical agitator means advantageously co-operate with means for measuring the energy which is absorbed by the material which is submitted to said treatment, and they comprise at least one agitator member which is, for example comprised of a rotor provided with a plurality of blades.

The chemical or physico-chemical process or processes which take place in the course of the implementation of the process ensuring the transformation of the initial mixture of different thermoplastic polymers into a homogeneous material are not yet fully elucidated, and the invention Is not limited in any way by the nature of these processes, nor by the order in which they proceed, nor by their duration.

It appears, however, that during the agitation and the stirring treatment of the mixture of thermoplastic polymers or copolymers, the solid particles undergo simultaneously a fast individual heating due to their mutual friction and/or their friction against the agitator members and the walls of the treatment chamber, so that they practically all find themselves heated at the same time to a temperature comprised within each of their respective softening ranges. It also seems that a decrease occurs in the average size of the particles at a certain stage of the treatment, at which at least one portion of the particles still remain in the solid state or at which at least one portion of the particles are at least partly liquid or in a pasty state.

Whatever the reason, one notes a relatively abrupt transition from a stage in which the different individual thermoplastic polymer or copolymer particles of the initial mixture are separated from one another and can be observed individually, and a later stage in which it is not possible any more to distinguish separation interfaces between these particles and in which the entire mass has taken a homogeneous appearance, except for the possible occurrence of particles of material non miscible with the thermoplastic polymers.

These phenomena are totally surprising, considering that we can be dealing with polymer particles with a relatively low melting point, for example, polyolefins, and with polymer particles with a relatively high melting point, such as polyamides.

The temperature reached within the mixture of thermoplastic polymers or copolymers subjected to the treatment according to the present process are generally comprised within the range from 150° to 300° C.

The homogeneous mass resulting from the agitation, and the stirring treatment is generally obtained in the form of a paste having theological characteristics corresponding to the so-called "pseudoplastic state".

Advantageously, this homogeneous pasty m ass is immediately subjected to a granulation treatment designed to put it in the form of granules of the usual type suitable for use in the machines manufacturing moulded or injected parts, according to known industrial techniques.

To this end, one can use any granulating machine of a known type, for example, using extrusion under pressure. Advantageously, and also in a manner known per se, filtering of the paste is carried out during the granulating operation, for example, by means of a sieve of wire mesh, in such a manner as to separate the particles of solid material possibly contained in this paste. Such particles of solid material can consist of thermosetting polymers, of metals, of inorganic materials, such as debris of stone, glass, etc., and generally of any material not miscible with the thermoplastic polymers.

The invention is, in particular, applicable to the treatment of a starting material containing at least two different thermoplastic polymers or copolymers in a divided state, and at least one solid material which is not miscible with said thermoplastic polymers or copolymers. At least one filtering step of the obtained product is then carried out, so as to separate therefrom the particles of material different from said homogeneous thermoplastic material which are dispersed in this latter material.

One can carry out the process according to the invention continuously or non-continuously, i.e. by treating the initial mixture of thermoplastic polymers or copolymers by successive batches.

A device for carrying out the process is characterized in that it comprises a chamber provided with agitator and stirrer means; means for introducing a starting material to be treated into this chamber; and means for discharging out of this chamber the product obtained by the treatment of starting material in this chamber.

Advantageously, the agitator means comprise at least one propeller or one rotor provided with blades and rotating at a high speed, for example having a rotational speed comprised between 1000 and 2800 rpm.

However, one can use any other appropriate agitator and/or stirrer and/or mixing means, mechanical or non-mechanical.

According to one particularly advantageous embodiment of this device, said chamber is in a cylindrical shape and with a horizontal axis, and said agitator and stirrer means consist of a rotor provided with a plurality of blades, this rotor being mounted co-axially with respect to the axis of the chamber and extending therethrough, and being connected to drive means for rotating the rotor, disposed outside the chamber.

An object of the invention is also the application of the above mentioned process to the obtention of plastic material parts, characterized in that the product is put into the form of parts shaped by injection moulding.

BRIEF DESCRIPTION OF THE DRAWINGS

The invention will be better understood from the following detailed description of non-limiting exemplary embodiments of the process according to the invention and of an exemplary embodiment, also non-limiting, of a device for carrying out this process, wherein reference is made to the appended drawings, in which:

FIG. 4 is a schematic cross-sectional view of the device; and

DESCRIPTION OF THE PREFERRED EMBODIMENT

Figure 1:
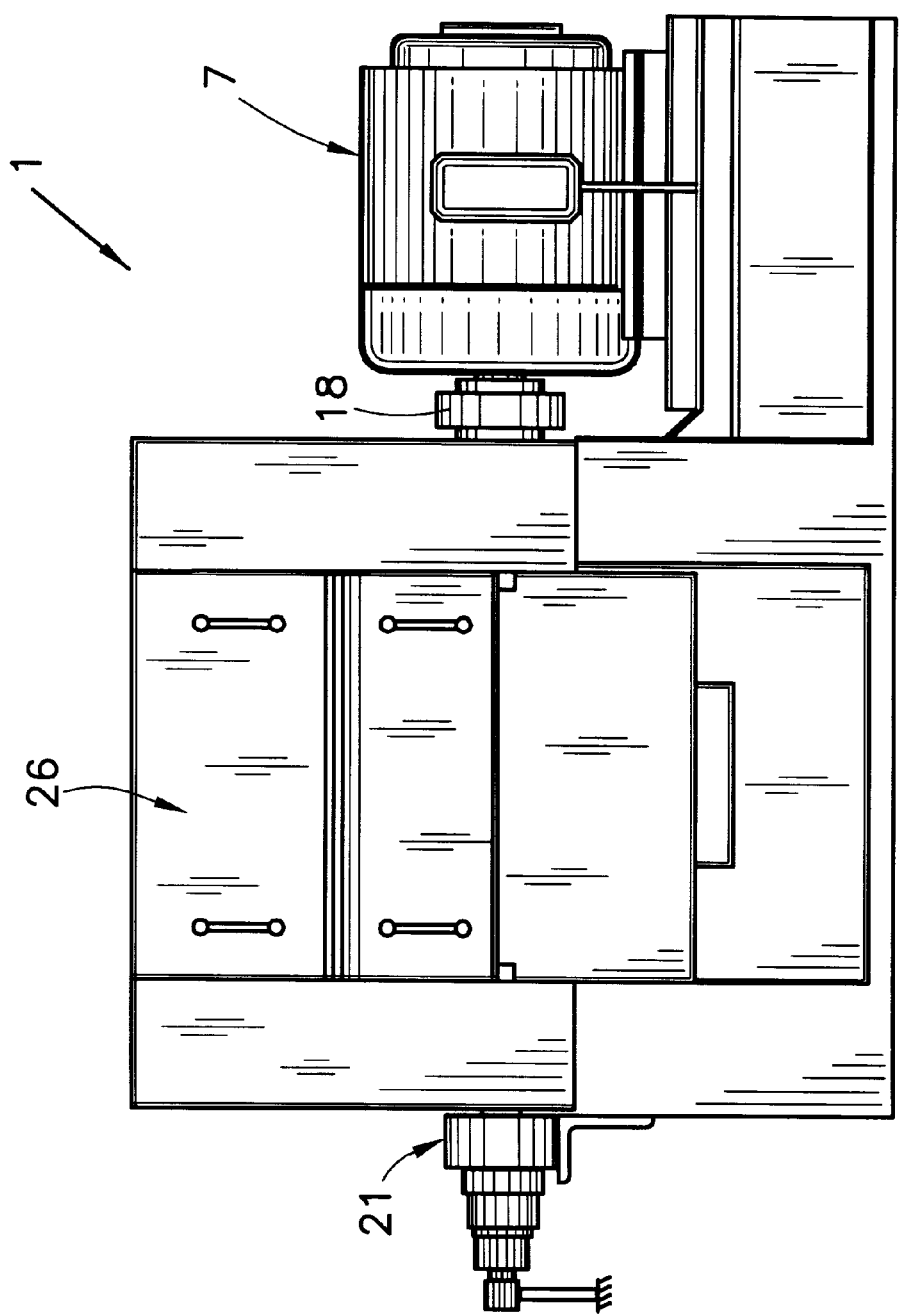
FIG. 1 is a schematic front view of the device.
Figure 3:
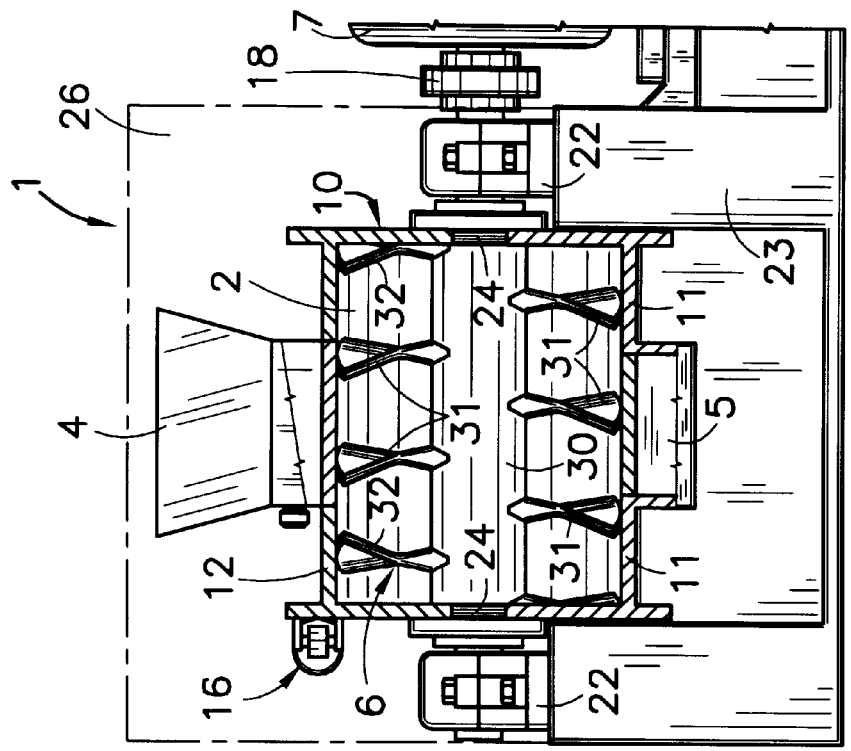
FIG. 3 is a schematic view of the same portion of the device as FIG. 2, but with certain elements and members shown in cross-section.
Figure 2:
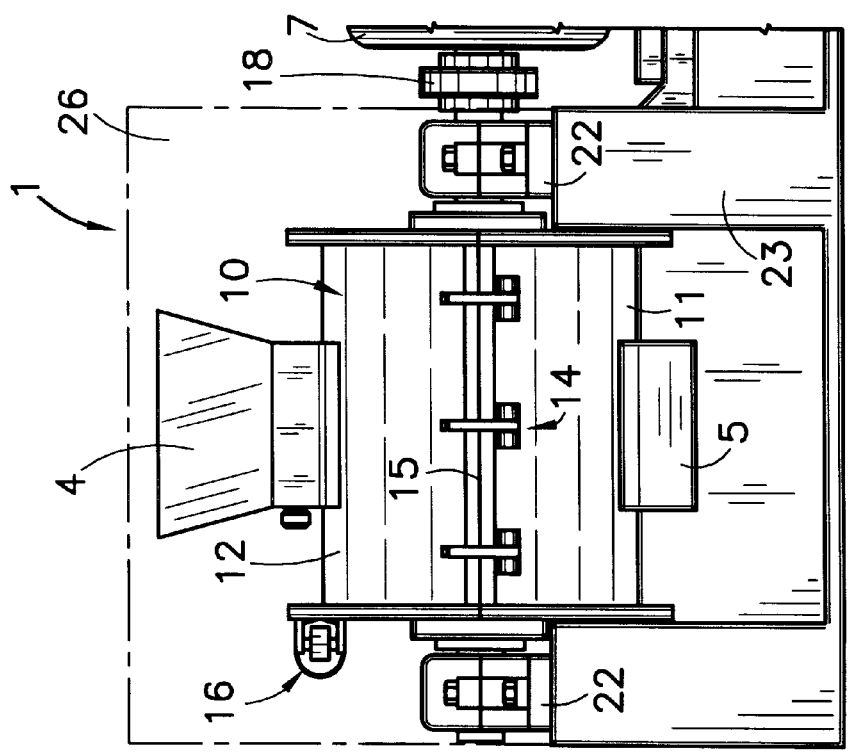
FIG. 2 is a schematic front view of a portion of the device, shown in FIG. 1.

The device shown in the FIGS. 1 TO 5 comprises a cylindrical chamber 2 with a horizontal axis, provided with a feeding hopper 4 placed in an upper position and a discharge well 5. A rotor 6, mounted co-axially inside the chamber 2, is operated by means of an electric motor 7. The walls of the chamber 2 consist of an assembly 10 formed by uniting two semi-cylindrical shells 11 and 12, assembled together by means of a hinge along one lateral edge 13 and a safety closing device 14 is disposed along the edge 15 opposite the edge 14.

The upper shelf 12 is connected to a pneumatic device 16 of a type known per se which makes possible its opening by pivoting around the hinge 13. The driving motion of the rotor 6 by the motor 7 is transmitted by means of a pneumatically controlled clutch 18. The rotation of rotor 6 can be interrupted at will by means of a braking device 21, also pneumatically controlled.

The rotor 6 is supported at each of its ends by a bearing 22, fastened on a pillar 23. A threaded joint 24 makes it possible to pass each end of the shaft of the rotor 6 tightly through the wall of the chamber 2.

A protective cover 26 (FIG. 1) surrounds the portion of the device comprising the chamber 2 and the rotor bearings 22.

Figure 5:
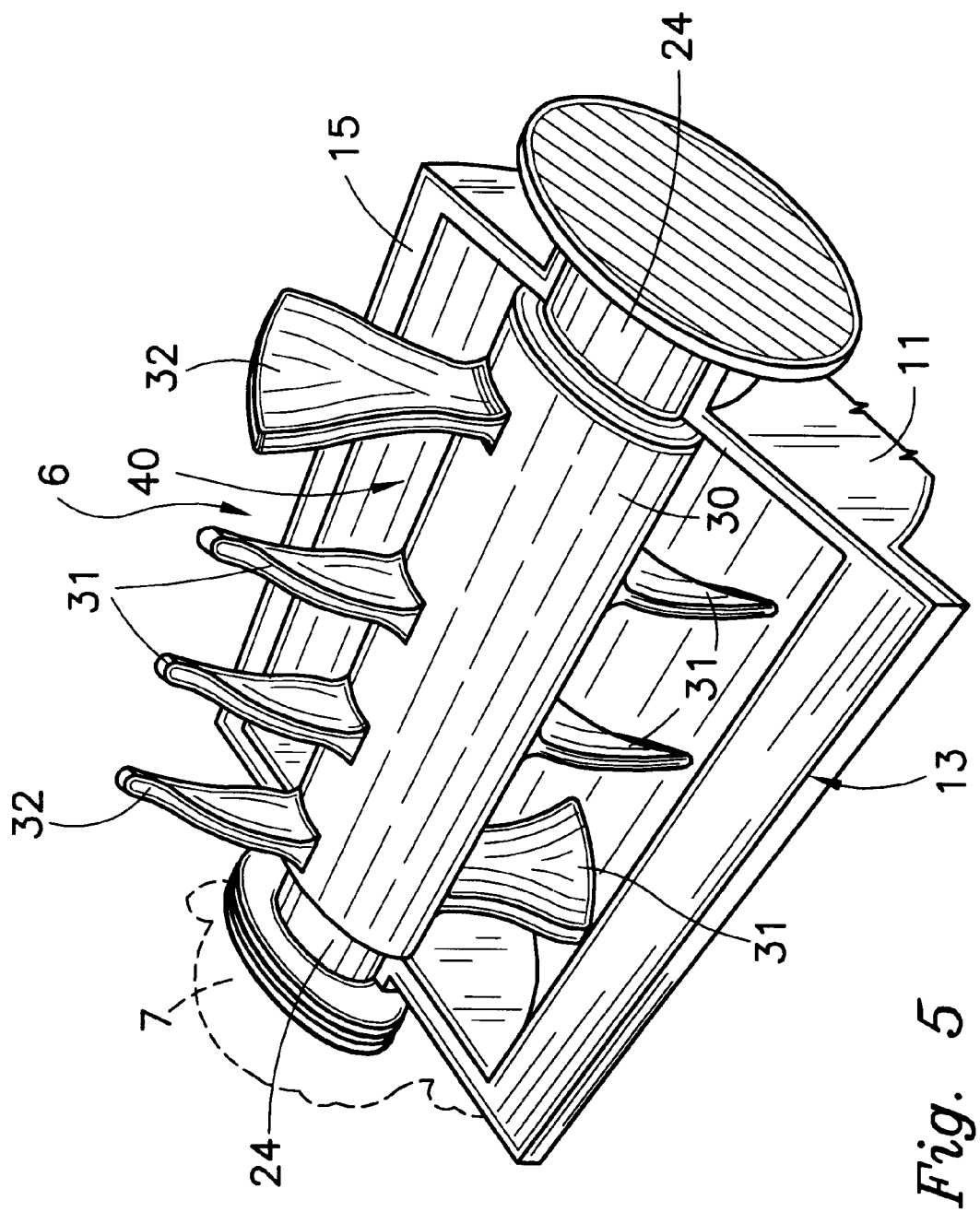
FIG. 5 is a partial schematic view of a rotor forming part of the device.

As can best be seen in FIG. 5, the rotor 6 comprises a cylindrical shaft 30 provided with a plurality of radial blades 31, 32, the shapes of which are of two different types. More precisely, the orientation of the blades 32, which are mounted in the vicinity of each end of the shaft 30 is such that it acts to impart to a load of material being treated in the chamber 2 a motion which tends to push this material away from the chamber wall adjoining the ends of the shaft 30 to bring it back towards the inside of the chamber, through the region subjected to the agitation and stirring action of the blades 31.

Advantageously, the diameter of the chamber 2 and the length of the blades 31 and 32 are such that, when the rotor 6 is at room temperature or in the vicinity of this temperature, the clearance between the tips of the blades 31 and 32 and the inner wall 40 of chamber 2 is in the order of 0.5 to 1 mm.

It has been found advantageous that the rotor 6 and its drive motor 7 be dimensioned relatively to the inner volume of the chamber 2, so that the maximum mechanical power transferable to the material being treated in the chamber 2 by the rotor 6 be in the order of 1 to 2 kW for each liter of material. For example, for a total inner volume of the chamber 2 of 85 liters (case of an experimental prototype), it was found that, the maximum power delivered by the motor is advantageously in the order of 128 kW.

EXAMPLE 1

The starting material used is a mixture of thermoplastic polymers, in the form of irregularly shaped fragments, but all of dimensions lesser than 5 mm, originating from the recovery of waste plastic materials in domestic refuse and which, after their separation from the other components of the refuse, had simply been subjected to a wash with water, followed by drying.

The average composition of this mixture is the following (in percent weight):

| | |
|---|---|
| ABS resin: | 50 |
| Polyvinyl chloride: | 20 |
| Polypropylene: | 15 |
| Polyethylene: | 5 |
| Polyamide: | 5 |
| Polymethylmethacrylate (PMMA): | 5 |

For the treatment of this mixture, a device of the above described kind is used in which the agitation and stirring chamber has an inner volume of 85 liters, the motor used for driving the rotor being a three-phase electric motor with a pole changer, with a maximum power of 140 kW, supplied with a 380 V/50 Hertz current, with a cosinus phi value of 0.85. After a time of rotation of the rotor in the order of three minutes, one notes a steep increase, immediately followed by a stabilization, of the power consumption by the mass subjected to the agitation and stirring, which shows a peak in the intensity of the current supplied to the motor, reaching a maximum value in the order of 270 to 280 A at the top of the peak. The duration of the rise of the intensity of the current between the initial value and the top of the peak as well as that of the subsequent fall of the intensity (to a stabilized value which is above the initial value) are both of about 5 seconds. The time of rotation of the rotor is extended during about 10 to 20 seconds after the stabilization of the intensity of the current supplied to the drive motor of the rotor, then the rotor is stopped and the homogeneous gel-like pasty mass resulting from the treatment of the mixture of polymers is immediately recovered.

This mass is subjected either immediately after its recovery from the treatment chamber or after its solidification by cooling, to a granulation treatment through extrusion in a machine of a known type, with filtration by means of a sieve of wire meshing. Granules of thermoplastic material of a size of about 3 mm are thus obtained, of a perfectly homogeneous appearance, even when examinations are carried out with a magnifying glass. These granules are perfectly adapted for use in an industrial injection moulding machine, in the same manner as granules of pure thermoplastic ABS resin, making it possible to obtain moulded parts of excellent quality which exhibit a perfect isotropy of the mechanical and physical properties.

EXAMPLE 2

The procedure is the same as in example 1, except that a mixture of thermoplastic polymers is used as raw material having the following average composition (in percent weight):

| | |
|---|---|
| Polyethylene (a mixture of equal parts of high-density and low-density polyethylene): | 45 |
| Polystyrene: | 20 |
| Polyvinyl chloride: | 20 |
| Mixture of two equal parts of polyester and of polyamide: | 12 |
| Polymethylmethacrylate (PMMA): | 3 |

One notes, after a time of rotation of the rotor of about 90 seconds, a peak in the intensity of the current supplied to the motor, reaching a maximum value in the order of 230 A. The time of rotation is extended as in Example 1 during about 10 to 20 seconds after this peak, before recovering the homogeneous gel-like pasty mass of a pseudoplastic consistency, resulting from the treatment.

Granulation is then carried out through extrusion, with filtration of the paste, as in Example 1.

Homogeneous granules of thermoplastic material are thus obtained, which are suited for use in an industrial injection moulding machine, in a manner similar to the use of granules of pure high-density polyethylene resin.

It should be noted that the process which has just been described, is perfectly adapted for obtaining a thermoplastic material having predetermined properties, intermediate between those of the various initial polymers and copolymers and that it is possible to keep constant the properties of the final product, even in case of fluctuations of the average composition of the mixtures used as raw material.

In actual fact, and as it will be obvious to those skilled in the art, one only needs to analyze the starting materials and the final product to determine the amounts of thermoplastic polymers or copolymers of one or several types to be added to the starting mixtures to achieve the corrections necessary for obtaining a final product having the desired properties and to maintain these properties in case of variation of the composition of the raw materials.

Obviously, one can add to the mixtures of thermoplastic polymers or copolymers in a manner known per se, any substance or mixtures of substances capable of improving the properties of the final thermoplastic material, for example plastifiers, stabilizing agents, colorants, fillers, etc., and it is clear that due to the nature itself of the operations of the process, which comprise a stirring and an agitation which are particularly efficient, a perfectly homogeneous distribution of these substances is achieved in the final product.

What is claimed is:

1. A method for treating heterogeneous plastic materials comprising:

providing at least two different thermoplastic polymers or copolymers in a divided state, heating said polymers or copolymers to at least the respective softening temperatures of said polymers or copolymers by subjecting said polymers or copolymers to friction generated by application of agitation and stirring, determining the energy consumed during said agitation and stirring, and stopping said treatment after the occurrence of a peak intensity in the energy consumed during said subjecting step.

2. The method according to claim 1, wherein said agitation and stirring is stopped when a substantially constant value of said energy consumption is achieved after the occurrence of said peak intensity thereof.

3. The method according to claim 1, wherein said agitation is carried out in a chamber provided with a mechanical stirrer.

4. The method according to claim 3, wherein said stirrer comprises a rotor provided with a plurality of blades.

5. The method according to claim 4, wherein the blades rotate at high speed.

6. The method according to claim 4, wherein the blades rotate at a speed between 1000 and 2800 rpm.

7. The method according to claim 1, wherein at least one filtering step of the homogeneous thermoplastic material product obtained is carried out to separate therefrom the particles of material different from said product that are dispersed therein.

8. The method according to claim 7, wherein the product is subjected to a granulation treatment.

9. The method according to claim 1, wherein the product is subjected to a granulation treatment.

10. A part of plastic material made by injection molding a homogeneous thermoplastic material obtained by the method of claim 1.

11. A method for treating heterogeneous plastic materials comprising:

providing at least two different thermoplastic polymers or copolymers in a divided state, heating said polymers or copolymers to at least the respective softening temperatures of said polymers or copolymers by subjecting said polymers or copolymers to friction generated by application of agitation and stirring in a chamber with a mechanical stirrer comprising a rotor provided with a plurality of blades that rotate at a speed between 1000 and 2800 rpm, and cooling homogeneous thermoplastic material thus obtained.

12. A method for treating heterogeneous plastic materials comprising:

supplying at least two different thermoplastic polymers or copolymers in a divided state into a vessel with a mechanical stirrer having a plurality of rotating blades that rotate at a speed between 1000 and 2800 rpm, heating said polymers or copolymers to at least the respective softening temperatures of said polymers or copolymers by subjecting said polymers or copolymers to friction generated by agitation and stirring of said polymers or copolymers against said blades, and removing homogeneous thermoplastic material thus obtained from said vessel.

13. A method for treating heterogeneous plastic materials comprising:

supplying at least two different thermoplastic polymers or copolymers in a divided state into a vessel having a containment surface and a mechanical stirrer having a plurality of blades that rotate at a speed between 1000 and 2800 rpm, heating said polymers or copolymers in said vessel to at least the respective softening temperatures of said polymers or copolymers by subjecting said polymers or copolymers to friction generated by agitation and stirring of said polymers or copolymers against said containment surface, and removing homogenous thermoplastic material thus obtained from said vessel.

* * * * *